United States Patent [19]

Witthoft et al.

[11] Patent Number: 5,164,578
[45] Date of Patent: Nov. 17, 1992

[54] TWO-DIMENSIONAL OCP WAVEFRONT SENSOR EMPLOYING ONE-DIMENSIONAL OPTICAL DETECTION

[75] Inventors: Carl G. Witthoft, Acton; Allan Wirth, Bedford; Lawrence E. Schmutz, Watertown; Theresa L. Bruno, Bedford; Bruce W. Baran, Lexington, all of Mass.

[73] Assignee: United Technologies Corporation, Hartford, Conn.

[21] Appl. No.: 627,676

[22] Filed: Dec. 14, 1990

[51] Int. Cl.$^5$ .................................. G01J 1/20
[52] U.S. Cl. ........................... 250/201.9; 356/121
[58] Field of Search ............ 250/201.9, 237 G, 237 R; 356/121, 149, 354

[56] References Cited

U.S. PATENT DOCUMENTS

| | | | |
|---|---|---|---|
| 4,141,652 | 2/1979 | Feinleib | 356/121 |
| 4,399,356 | 8/1983 | Feinleib et al. | 250/201 |
| 4,712,913 | 12/1987 | Bareket | 356/121 |
| 4,725,138 | 2/1988 | Wirth et al. | 356/121 |

Primary Examiner—David C. Nelms
Assistant Examiner—Que T. Le
Attorney, Agent, or Firm—Richard H. Kosakowski

[57] ABSTRACT

An improved two-dimensional optical centroid processor ("OCP") wavefront sensor is described in which a scanning mirror 146 scans the wavefront of input light 130 to provide a scanned beam 148 (i.e. a portion of the wavefront). The scanned beam 148 is focused on an OCP 168 filter comprising four rows of mask cells. The filtered light emanating from the cells impinges on one-dimensional photodetector devices 192, 198, 202, 206 (i.e. photodetector rows). Thus, the scanning of the wavefront by the scanning mirror provides two-dimensional measurement while employing one-dimensional photodetector devices. Each of the photodetector devices provides an output to a ratio calculator 201 which is used to correct the tilt in the wavefront by driving a deformable mirror (not shown).

5 Claims, 5 Drawing Sheets

TWO-DIMENSIONAL OCP WAVEFRONT SENSOR EMPLOYING ONE-DIMENSIONAL OPTICAL DETECTION

This invention relates to optical wavefront sensing, and more particularly to two-dimensional optical centroid processor wavefront sensing.

BACKGROUND ART

Adaptive optic systems for correcting wavefront distortions in a light beam are well known in the art. A critical element of these systems is the wavefront sensor which detects the distortions. The distortions are generally caused by the wavefront passing through an atmospheric disturbance. The planarity of the wavefront is improved by correcting these distortions, which must first be accurately detected.

The apparatus labeled prior art in FIG. 1 herein, of U.S. Pat. No. 4,725,138 to Wirth et al., is a method for detecting the distortions. The apparatus is an optical centroid processor ("OCP") wavefront sensor which employs a filter array to detect and quantify a wavefront tilt.

Referring to FIG. 1, a light beam 30 from a distant object or the return beam from an object illuminated by a reference source is focused on the apparatus. The light beam 30 may be alternated in a beam combiner 32 with a reference beam 34, generally from a laser 36, forming a beam 38 which is imaged on a lenslet array 40. The lenslet array divides the combined beam 38 into a plurality of subaperture beams 42 which are focused on an image intensifier 44. The subaperture beams are amplified and focused on a collimator 46. The collimated beams 48 are impinged on a pair of lenses 50,52 by a beam splitter 54. The first lens 50 focuses subaperture images 55 on each cell 56 of a filter array 58 forming a pixel spot on each cell, the circumference of which is shown by a line 60 (FIG. 1A). A filtered subaperture image 62 is impinged on each corresponding cell 64 of a photodetector array 66. The detector array comprises a plurality of photodiodes or other devices which convert photon energy to electric energy. The second lens 52 focuses a subaperture image 68 directly on each cell of a reference photodetector array 70.

Each mask cell 56 comprises a plurality of opaque chevrons 72 (FIG. 1A) which are wider on one end and decrease in the positive x-direction, and a plurality of transparent chevrons 74 which are wider on the other end and decrease in the negative x-direction. Whenever there is a tilt in the subaperture wavefront in the x-direction, the spot, indicated by a dashed line 60a, from the subaperture beam 55 is shifted from the center of the mask cell, thereby increasing the intensity of the light through the cell to the photodiode as compared the center spot, assuming the same intensity. A corresponding pixel spot (i.e. a shifted spot when there is a tilt and an un-shifted spot when there is not) is also measured without passing through a filter array on the reference photodetector array 70. The amount of light to the photodiode directly corresponds to the electrical output of the photodiode.

Thus, for a particular pixel cell, the photodiode output is compared to the reference photodiode output of the corresponding cell to determine the amount of shift in the spot. A ratio calculator 76 is connected to the photodetector arrays 66,70 by a pair of lines 78,80, to perform calculations based on a predetermined algorithm. The shift in spot position represents the tilt in a portion of the wavefront in the x-direction. The information obtained from the ratio calculator is used to correct the tilt in the wavefront of the original light beam by adjusting a deformable mirror (not shown).

The OCP sensor also provides for detecting the wavefront tilt on two axes as described in an alternate embodiment of the apparatus in the '138 patent. Referring now to FIG. 2 herein, the image impinged on the collimator 82 is achieved in the same manner as previously described. The collimator focuses three identical images 84 on three separate identical lenses 86,88,90. The first lens 86 focuses a subaperture image 92 on each cell 93 of a first filter array 94, which consists of mask cells 93 (FIG. 2B) comprising a plurality of opaque chevrons 98 and a plurality of transparent chevrons 100 in the x-plane. A pixel spot, the circumference of which is shown by a line 102, is focused on the center of the mask cell when this portion of the wavefront is without a tilt. When this portion of the wavefront is tilted, a shifted spot, shown by a dashed line 102a, is produced. The intensity of the light 103 through the x-direction cell 93 is detected by the corresponding photodiode in the first photodetector array 104 (FIG. 2).

The second lens 88 focuses a plurality of subaperture images 105 directly on a second photodetector array 106. The third lens 90 focuses a plurality of subaperture images 108 on a second filter array 110, which comprises an array of mask cells 112 (FIG. 2C), each cell having a plurality of opaque chevrons 114 and a plurality of transparent chevrons 116 in the y-plane. A pixel spot, the circumference of which is shown by a line 118, is focused on the center of the mask cell when this portion of the wavefront is without a tilt. When this portion of the wavefront is tilted a shifted spot, shown by a dashed line 118a, is produced. The intensity of the light through the y-direction cell 112 is detected by the corresponding photodiode in the third photodetector array 122. An output signal of each of the corresponding photodiodes for the x-direction and each of the photodiodes for the y-direction is compared to the corresponding photodiode output signal in the second photodetector array by the ratio calculator. Thus, wavefront tilt can be detected on two axes.

Generally, the OCP system described in patent '138 employs two-dimensional photodetector arrays. The two-dimensional arrays are employed because individual photodiodes or one-dimensional photodetector devices would require a complex mechanical system to optically align the photodiodes.

DISCLOSURE OF THE INVENTION

Objects of the present invention include provision of an improved two-dimensional OCP wavefront sensor, which two-dimensionally detects an optical wavefront on multiple axes employing linear (one-dimensional) photodetector devices.

According to the present invention, a beam optically focused onto a scanning mirror which directs a portion of the beam onto a pair of mask filter rows, one row for each directional axis, and a pair of reference filter rows, one row for each mask filter row, the beam intensity from each filter row is impinged on a corresponding one-dimensional photodetector row, the photodetector row outputs associated with the mask filter rows are compared to the photodetector row outputs associated with the corresponding reference filters to provide an electrical signal indicative of that portion of the beam, the scanning mirror samples each portion of the beam to provide for two-dimensional detection.

The present invention detects a wavefront over two dimensions by employing a scanning mirror for sampling each portion of the wavefront. Sampling of the wavefront allows the filtered light to be detected by one-dimensional photodetector devices. The one-dimensional photodetector devices are available in the higher quality materials while two-dimensional photodetector devices employed in the prior art are generally not. Moreover, the present invention measures a wavefront over two dimensions allowing the one-dimensional photodetector devices to be employed.

The foregoing and other objects, features and advantages of the present invention will become more apparent in light of the following detailed description of an embodiment of the invention, as shown in the accompanying drawings.

BEST MODE FOR CARRYING OUT THE INVENTION

Figure 1A:
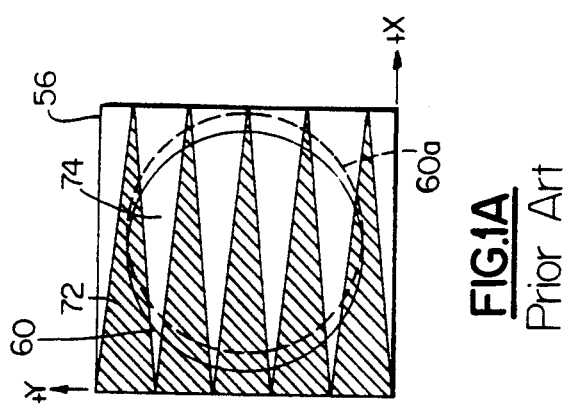
FIG. 1A is a front view of a prior art cell with a pixel spot.
Figure 1:
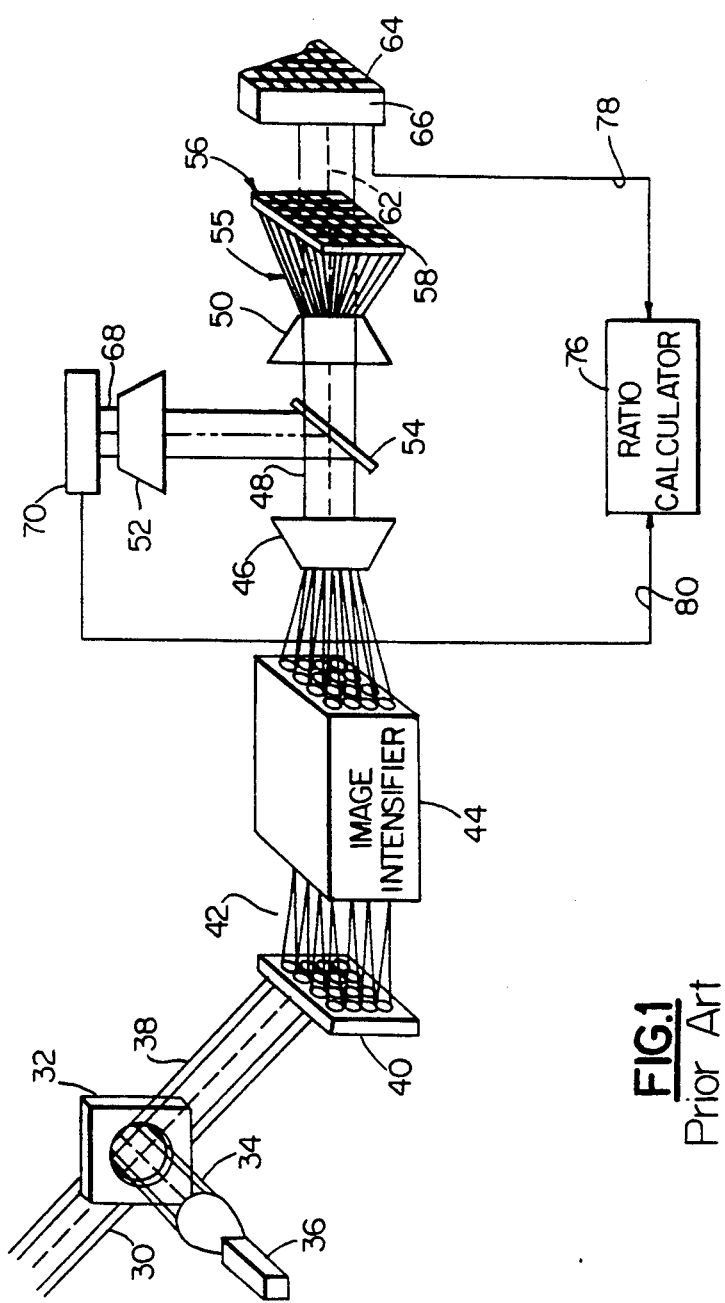
FIG. 1 is a perspective view of a prior art OCP sensor.
Figure 2A:
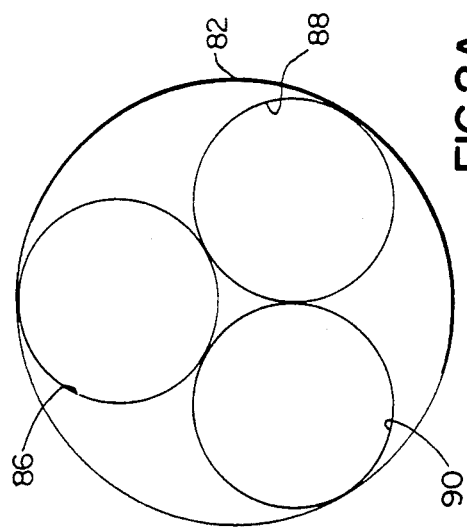
FIG. 2A is a front view in the direction of the lines 2A—2A of FIG. 2.
Figure 2C:
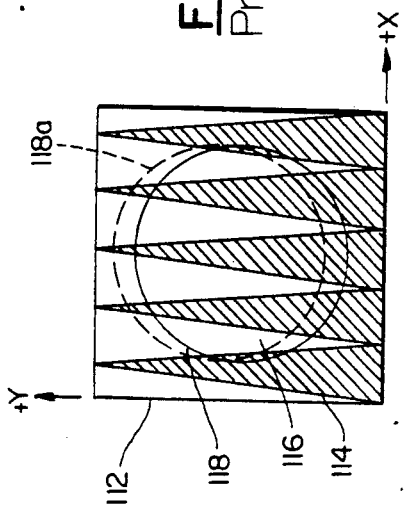
FIG. 2C is a front view of a prior art y-direction cell with a pixel spot.
Figure 2:
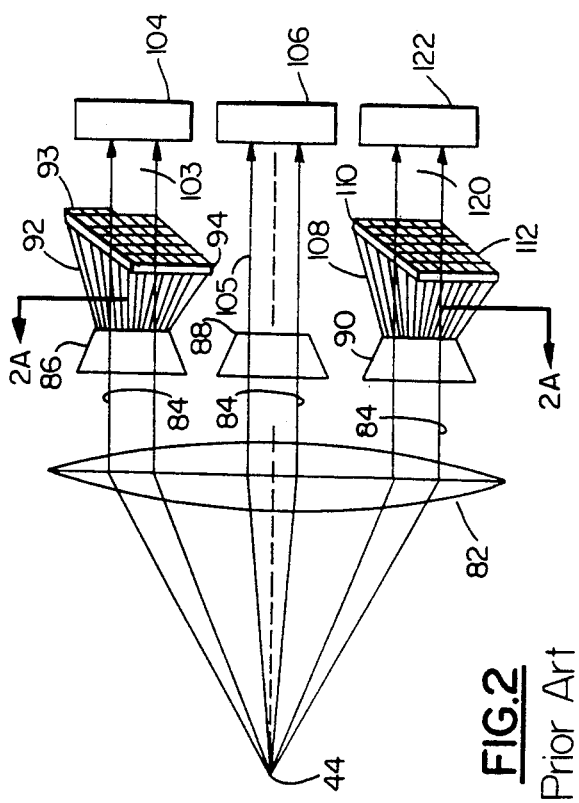
FIG. 2 is schematic view of a prior art two axes wavefront sensor.
Figure 2B:
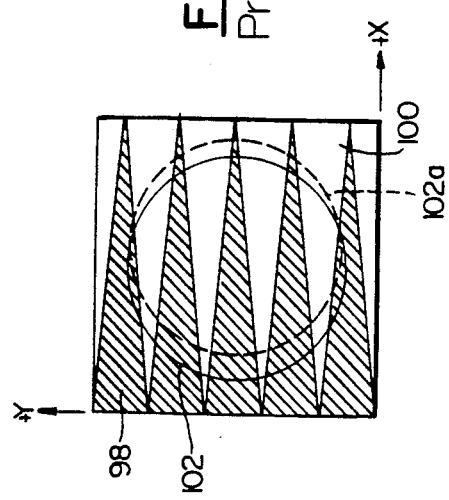
FIG. 2B is front view of a prior art x-direction cell with a pixel spot.
Figure 3:
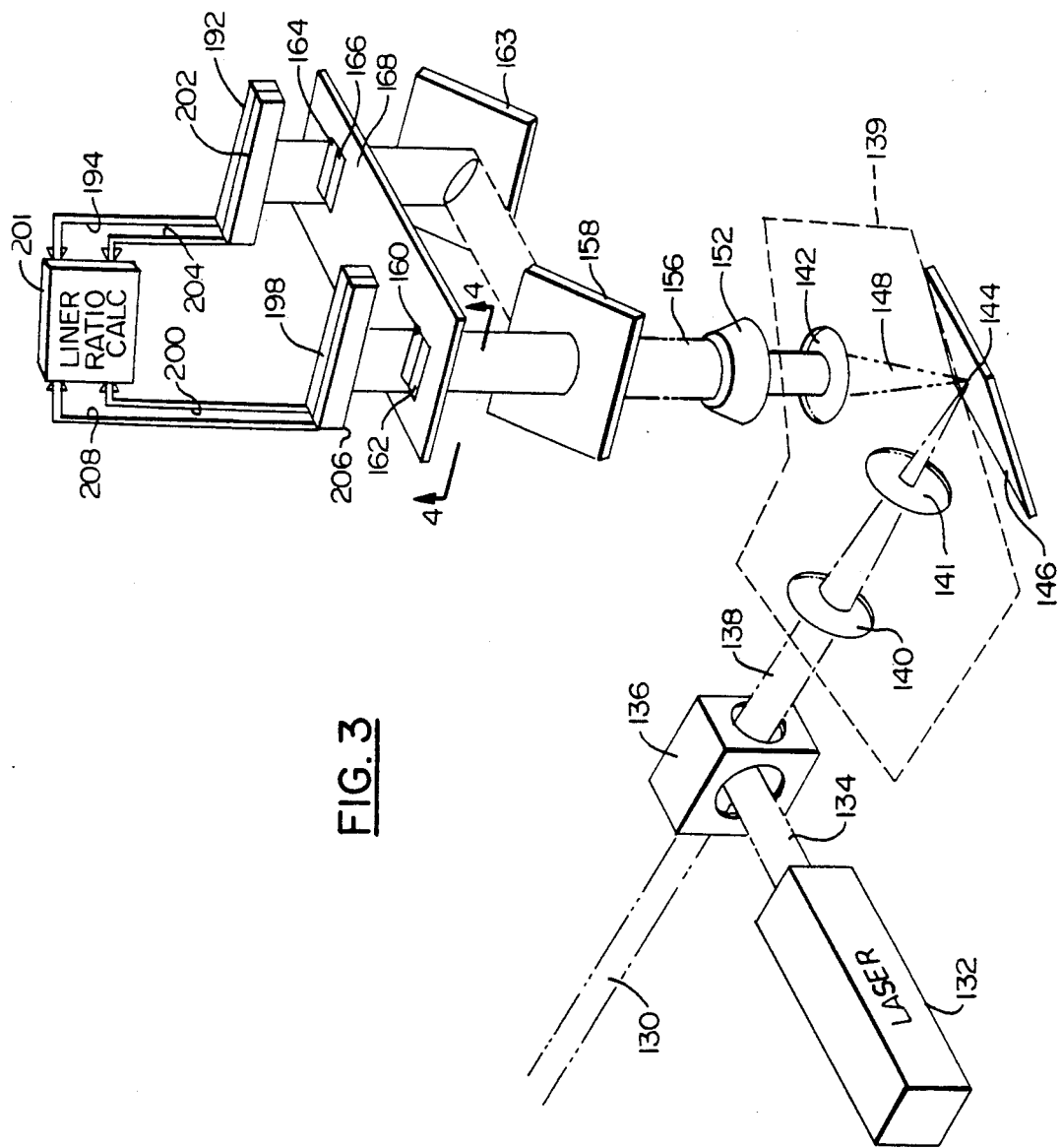
FIG. 3 is a simplified schematic diagram of a two-dimensional OCP wavefront sensor according to the present invention.

Referring now to FIG. 3, in an embodiment of the present invention, an external light beam 130 is focused on the invention. The light beam is from a distant object or may be a return beam from an illuminated object, in either of which a wavefront aberration is to be detected. A laser 132 provides a reference light beam 134 which may be used in place of the light beam 130 in a beam combiner 136 to form a calibration beam 138. The beam 138 is focused on a reduction telescope 139 comprising three lenses 140–142. Two of these lenses 140,141 impinge a focal point 144 of the beam on a scanning mirror 146 to produce a scanned beam 148. The portion of the scanned beam, comprising a portion of the wavefront, which is reimaged constitues the instantaneous sample. This portion is reimaged through the other lens 142 onto a monolithic lenslet module ("MLM") 152 comprising two rows of micro lenses.

There are two important reasons the scan point was chosen to be at this focus. Prior designs of both imaging and wavefront sensing equipment utilizing linear detector arrays have scanned at an optical location equivalent to a point just before or after the MLM 152.

First, the spot images formed by the MLM remain stationary (in the absence of aberrations in the sample beam). If the beam were scanned in the conventional manner, i.e., between the lens 142 and the MLM 152, the spot images would traverse the detector elements during each sample period. In such a case, the X and Y sensing channels must be split and scanned separately to avoid scanning any spot along its responsive axis.

Second, the optical configuration is such that mechanical wobble in the scan mirror does not produce positional error in the spot images on the OCP filters. This means the present design is more reliable and cheaper to build and maintain.

The two rows of micro lenses correspond to the portion of the wavefront reflected from the scanning mirror (i.e. the scanned beam). The micro lenses produce two rows of subaperture beams 156 which pass through a beam splitter 158. One output of the beam splitter 158 directs one row of subaperture beams on an x-direction ("X") monotonic filter row 160, and the other row of subaperture images on a y-direction ("Y") monotonic filter row 162. The second output of the beam splitter 158 consists of copies of the corresponding two rows of subaperture beams. A directional mirror 163 directs one row of the corresponding subaperture beams on an x-axis reference ("ZX") filter row 164 and the other row on a y-axis reference ("ZY") filter row 166.

The four filter rows, each of which is separated from the other by an opaque region 167 (FIG. 4), comprise an OCP filter 168. Each of the individual cells is also separated from the other cells by the opaque region.

Figure 5:
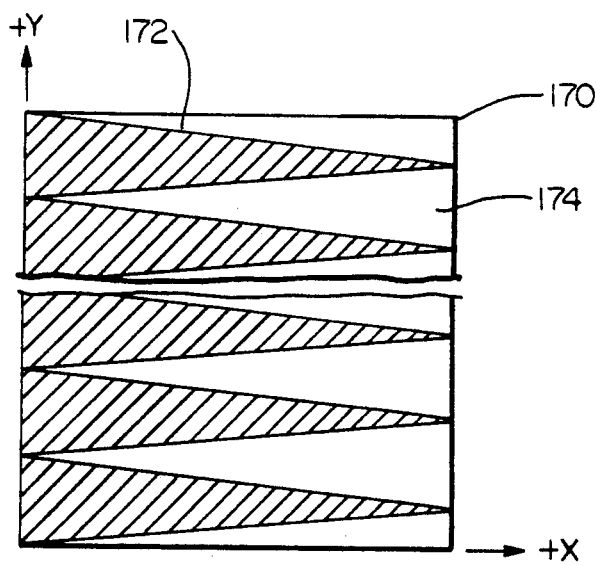
FIG. 5 is a front view of a single X filter cell in accordance with the present invention.

The X filter row 160 comprises a plurality of X mask cells 170 (FIG. 5). Each X cell 170 comprises a plurality of opaque elongated "V" shape or chevron patterns 172, hereinafter referred to as chevrons, which are wider at one end and decrease in the positive x-direction, and a plurality of transparent chevrons 174 which are wider at one end and decrease in the negative x-direction.

Figure 6:
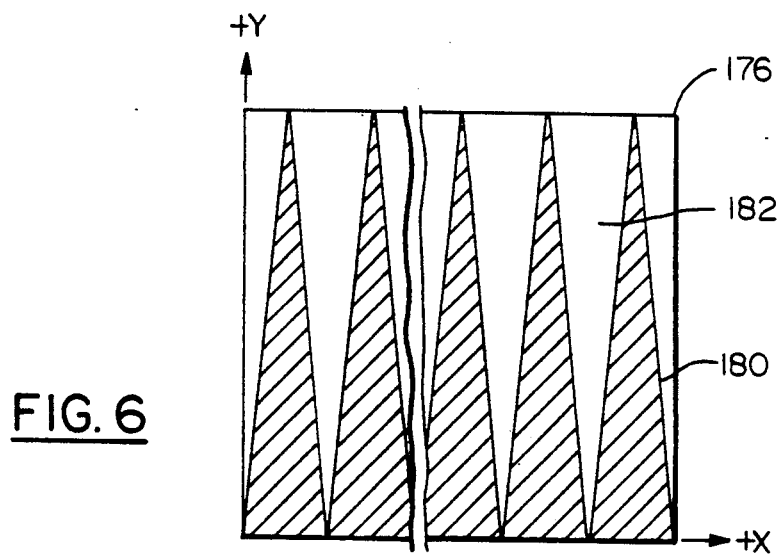
FIG. 6 is a front view of a single Y filter cell in accordance with the present invention.

The Y filter row 162 (FIG. 4) comprises a plurality of Y mask cells 176 (FIG. 6). Each Y cell 176 comprises a plurality of opaque chevron patterns 180 which are wider at one end and decrease in the positive y-direction, and a plurality of transparent chevrons 182 which are wider at one end and decrease in the negative y-direction.

The ZX filter row 164 (FIG. 4) comprises a plurality of ZX cells 184. Each ZX cell 184 comprises a transparent window 186 having the same dimensions as that of the area occupied by the chevrons in the X and Y cells.

The ZY filter row 166 comprises a plurality of ZY cells 188. Each ZY cell 188 comprises a transparent window 190 having the same dimensions as that of the area occupied by the chevrons in the X and Y cells.

Each mask cell has a glass substrate, whereupon the opaque area comprises a thin chrome film on the substrate and the transparent area comprises an absence of such film. Note that FIGS. 4–7 are not to scale and shown with only five opaque patterns per cell for illustration purposes, a cell actually comprising many patterns such that a pixel spot of light will cover many of the patterns. The patterns are intended to be very small so as to average out any spot motion in the axis opposite from that which the cell is detecting.

Figure 4:
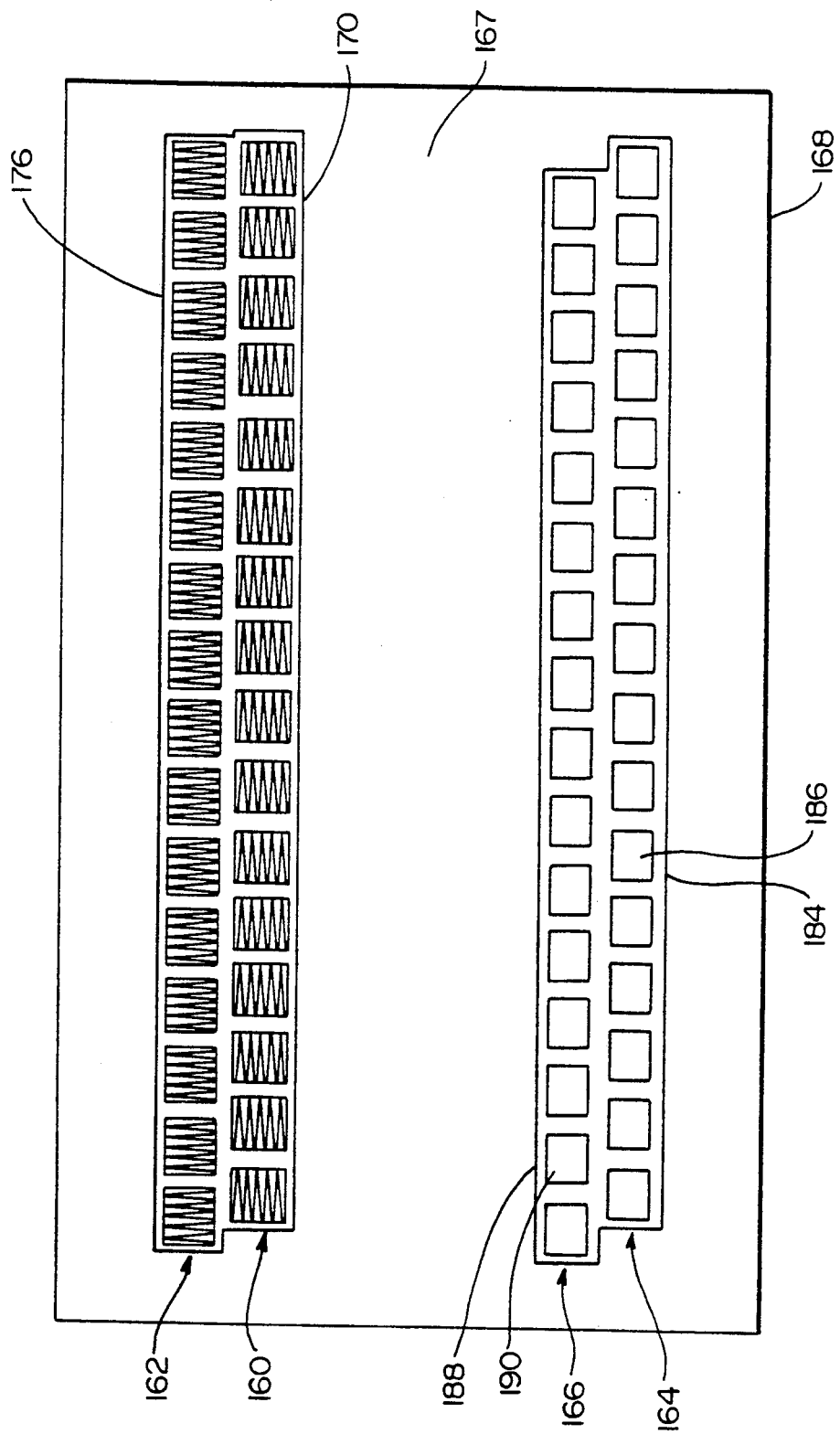
FIG. 4 is a front view in the direction of the line 4—4 of FIG. 3 of an OCP filter in accordance with the present invention.

Referring to FIGS. 3 and 4, the intensity of the remaining light emanating from the ZX filter row 164 impinges on a one-dimensional monolithic ZX photodetector device 192 (i.e. a photodetector row). Each cell of the ZX photodetector row comprises a photodiode region which converts photon energy into electrical energy. Each ZX filter cell 184 focuses on a corresponding photodiode in the row 192. Each photodiode produces an output (also called an output signal) on a corresponding one of a plurality of lines 194. The outputs, one from each of the photodiodes in the row, may be individual parallel outputs or the outputs may be clocked to produce a serial output.

The intensity of the remaining light emanating from the X filter row 160 impinges on a one-dimensional monolithic X photodetector device 198 (i.e., a photodetector row). Each X mask cell 170 focuses on a corresponding cell of the X photodetector row 198, wherein each cell comprises a photodiode. Each photodiode produces an output on a corresponding one of a plurality of lines 200 which is compared to a corresponding output on a related one of the lines 194 from the ZX photodetector row 192 in a linear ratio calculator 201. This comparison is made for each X cell to detect x-axis tilts in the portion of the wavefront reflected from the scanning mirror (i.e. the scanned beam).

The intensity of the remaining light emanating from the ZY filter row 166 impinges on a one-dimensional monolithic ZY photodetector device 202 (i.e. a photodetector row). Each ZY cell 188 focuses on a corresponding cell of the ZY photodetector row 202, wherein each cell comprises a photodiode. Each photodiode produces an output on a corresponding one of a plurality of lines 204.

The intensity of the remaining light emanating from the Y filter row 162 impinges on a one-dimensional monolithic Y photodetector device 206 (i.e. a photodetector row). Each Y mask cell 176 focuses on a corresponding cell of the Y photodetector row 162, wherein each cell comprises a photodiode. Each photodiode produces an output on a corresponding one of a plurality of lines 208 which is compared to the corresponding output on a related one of the lines 204 from the ZY photodetector row 202 in the linear ratio calculator 201. This comparison is made for each Y cell to detect y-axis tilts in the portion of the wavefront reflected from the scanning mirror (i.e. the scanned beam).

The individual filter rows allow linear (one-dimensional) monolithic photodetector devices to be employed. Unlike the prior art, wherein the X and Y filters are an array and two-dimensional monolithic detector devices are generally employed. The two-dimensional detector devices employed in the prior art are generally not available in the higher quality materials which provide increased sensitivity. The sensitivity becomes an increasingly critical factor with lower frequency light (e.g. mid infrared wavelength range). The one-dimensional devices are available in the higher sensitivity material, and, thus, effective with lower frequency light.

The scanning mirror 146 sweeps two rows of subaperture beams at a time across the MLMs and filter row in order to detect the entire wavefront. Thus, the entire image can be detected with the higher sensitivity one-dimensional photodetector devices. A first row of the two rows of subaperture beams 156 is employed for y-direction and a second row of the two rows of subaperture beams is employed for x-direction.

The use of two rows allows independent choice of X and Y subaperture origins, i.e., the subapertures need not be identically mapped from the main beam. It is even possible to shift the temporal sampling window of the X samples relative to the Y samples if desired. Use of two rows also dramatically reduces the cost, complexity, and failure rate compared to systems which split the incoming signal into two discrete X and Y sensing subsystems. No matter which approach is taken, each OCP cell can only detect motion in one axis, hence the need for X and Y sampling cells.

Figure 7:
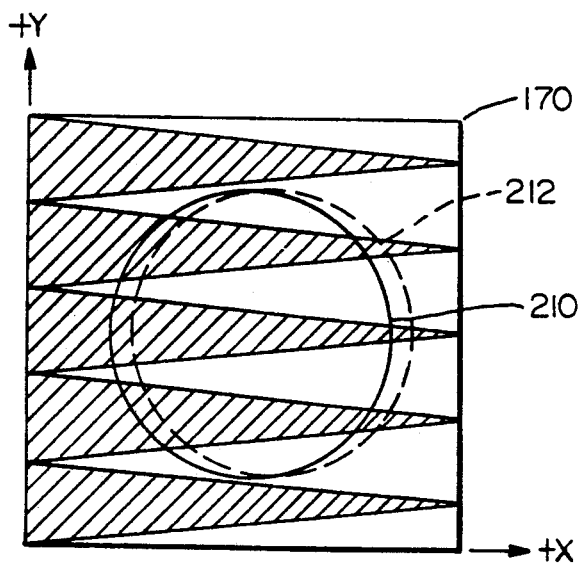
FIG. 7 is a front view of a single X filter cell with a pixel spot in accordance with the present invention.

The size and location of each cell corresponds directly to each micro lens size and location in the MLM 152. Each micro lens focuses a subaperture beam forming a pixel spot on each corresponding cell. Referring to FIG. 7, the X cell 170 is shown with a centered pixel spot, the circumference of which is shown by a solid line 210. The size of the pixel spot is the same for the X, Y, ZX, and ZY cells. However, the minimum spot diameter is limited to approximately the width of the widest portion of three chevrons, so that spot shifts in the axis opposite from that which the cell is detecting will be averaged out. The centered spot produces an X reference ratio from which a shift in the pixel spot is compared. The reference ratio for the cell is the intensity of light through the X mask cell 170 with the spot in the center as compared to the intensity of the light from a corresponding ZX cell 184 (FIG. 4). A tilt in the positive x-direction in the subaperture beam on this cell results in a shifted pixel spot, indicated by a dash line 212. The shifted spot allows more light through the filter cell, assuming equal intensity, which is compared to the intensity from the corresponding ZX cell and result in an X ratio. The X ratio of the shifted pixel spot is compared to the X reference ratio for that cell to determine the amount of tilt. The difference requires a correction to the light beam wavefront for this portion of the wavefront corresponding to the subaperture beam.

A tilt in the negative x-direction results in less light through the X mask cell and the same type of calculations are made. This process is repeated for each cell in the X filter row.

A tilt in the y-direction is detected by comparing the intensity from a shifted spot to the un-shifted spot on the Y and ZY cells in the same manner the X and ZX cells detect tilts in the x-direction. This process is repeated for each cell in the row.

When detection of the first two rows of subapertures are completed, the scanning mirror 146 (FIG. 3) is adjusted and the next two rows of subapertures are brought to bear on the filters in the same manner as previously described, onto the X, Y, ZX, and ZY filter rows. This process is repeated until the entire wavefront is detected.

The ratio calculator 201 may be employed to drive a deformable mirror (not shown). The deformable mirror comprises a plurality of electronically controlled actuators driving an array of glass or metal elements forming a face sheet. The row of actuators to be adjusted is dependent upon the portion of the wavefront that is directed onto the OCP filter 168 by the scanning mirror 146.

The foregoing description is merely exemplary and it should be understood that the invention may be implemented with other types of filters to detect shifts in the pixel spot.

Further, although the reduction telescope 139 is described to focus the combined beam onto the scanning mirror and then reimage it onto the MLM 152, other devices capable of focusing the beam onto the scanning mirror and then reimaging onto the MLM may be employed.

It suffices for the broadest scope of the present invention that wavefront aberrations are detected by scanning a wavefront with the scanning mirror focusing that portion of the beam onto the X, Y, ZX, and ZY filter rows which allow employment of a one-dimensional monolithic detector devices for each of the filter rows, thus, providing two dimensional detection of a wavefront.

Similarly, although the invention has been shown and described with respect to the exemplary embodiments thereof, it should be understood by those skilled in the art that the foregoing and various other changes, omissions and additions in the form of detail thereof may be made therein and thereto, without departing from the spirit and scope of the invention.

We claim:

1. An optical centroid processor wavefront sensor, for detecting the wavefront of a beam of light on two dimensions, comprising:

scanning means, for providing a scan beam, said scan beam being a portion of the wavefront;

reference means, responsive to said scan beam, for providing a reference signal indicative of the intensity of the light in the scan beam;

mask means, responsive to said scan beam, for filtering said scan beam, said mask means having a pair of directional axes, a first one of said axes orientated in a predetermined manner with respect to a second one of said axes, and having a mask function being monotonic dependent on light intensity on spot displacement;

detector means, responsive to said mask means, for providing a detected signal indicative of light intensity associated with said said mask function, and for providing one-dimensional optical detection along each said directional axes;

calculator means, in accordance with a predetermined algorithm, for calculating a ratio of said detected signal and said reference signal for each of said directional axes, to produce an output signal representative of spot displacement, and directing means for directing the beam of light onto said scanning means.

2. An optical centroid processor wavefront sensor according to claim 1, wherein said mask function comprises a linear function.

3. An optical centroid processor wavefront sensor according to claim 2, wherein said linear function comprises a row of linear mask cells for each said directional axes, each of said mask cells having an alternating series of transparent chevrons and opaque chevrons.

4. An optical centroid processor wavefront sensor according to claim 1, wherein said calculator means comprises at least one linear ratio calculation.

5. An optical centroid processor wavefront sensor according to claim 1, wherein said reference means further comprises a row of reference cells, each having a transparent section surrounded by an opaque region, for each said directional axes.

* * * * *